(12) United States Patent
Ueno et al.

(10) Patent No.: US 10,830,518 B2
(45) Date of Patent: Nov. 10, 2020

(54) HEAT CYCLE SYSTEM (71) Applicant: AGC Inc., Chiyoda-ku (JP)

(72) Inventors: Katsuya Ueno, Chiyoda-ku (JP);
Hidekazu Okamoto, Chiyoda-ku (JP);
Shigeo Kajitani, Chiyoda-ku (JP);
Tetsuo Otsuka, Chiyoda-ku (JP);
Masamichi Ipponmatsu, Nishinomiya (JP)

(73) Assignee: AGC Inc., Chiyoda (JP)

( * ) Notice: Subject to any disclaimer, the term of this patent is extended or adjusted under 35 U.S.C. 154(b) by 0 days.

(21) Appl. No.: 16/569,440

(22) Filed: Sep. 12, 2019

(65) Prior Publication Data

US 2020/0003469 A1 Jan. 2, 2020

Related U.S. Application Data (63) Continuation of application No. PCT/JP2018/009522, filed on Mar. 12, 2018.

(30) Foreign Application Priority Data

Mar. 14, 2017 (JP) .................................. 2017-049165

(51) Int. Cl.
*F25B 49/02* (2006.01)
*C09K 5/04* (2006.01)
(Continued)

(52) U.S. Cl.
CPC ............ *F25B 49/025* (2013.01); *C09K 5/045* (2013.01); *F04B 49/10* (2013.01); *F25B 1/00* (2013.01);
(Continued)

(58) Field of Classification Search
CPC .......... F25B 49/025; F25B 1/00; F25B 49/02; F04B 49/10; C09K 5/045; C09K 2205/22;
(Continued)

(56) References Cited

U.S. PATENT DOCUMENTS 4,820,130 A * 4/1989 Eber ....................... F04C 28/28
417/292
6,534,958 B1 * 3/2003 Graber .................... F02B 63/04
123/2

(Continued)

FOREIGN PATENT DOCUMENTS

JP 9-245689 A 9/1997
JP 2005-174588 A 6/2005
(Continued)

OTHER PUBLICATIONS

International Search Report dated May 22, 2018 in PCT/JP2018/009522 filed Mar. 12, 2018 (with English translation).
(Continued)

*Primary Examiner* — Emmanuel E Duke
(74) *Attorney, Agent, or Firm* — Oblon, McClelland, Maier & Neustadt, L.L.P.

(57) ABSTRACT

A heat cycle system with high durability, which employs a working fluid for heat cycle containing trifluoroethylene having a low global warming potential. A heat cycle system, having a circulation path in which a working fluid for heat cycle containing trifluoroethylene is circulated from a compressor via a condenser, an expansion valve and an evaporator to the compressor, wherein the compressor has in its electrical circuit a current-limiting apparatus capable of limiting the current within 6 milliseconds after the heat cycle system enters into an abnormal operation state.

11 Claims, 6 Drawing Sheets

(51) Int. Cl.
   *F04B 49/10*   (2006.01)
   *F25B 1/00*   (2006.01)
(52) U.S. Cl.
   CPC .. *C09K 2205/122* (2013.01); *C09K 2205/126* (2013.01); *C09K 2205/22* (2013.01)
(58) Field of Classification Search
   CPC .................. C09K 2205/126; C09K 2205/122; C09K 5/04
   See application file for complete search history.

(56) References Cited

U.S. PATENT DOCUMENTS

| | | | | |
|---|---|---|---|---|
| 7,197,890 | B2* | 4/2007 | Taras | F04C 28/06 417/279 |
| 9,480,177 | B2* | 10/2016 | Trudeau, Jr. | F04B 49/06 |
| 10,436,226 | B2* | 10/2019 | Groshek | F25B 49/02 |
| 2010/0207563 | A1* | 8/2010 | Higashikata | F04B 35/04 318/473 |
| 2013/0162387 | A1* | 6/2013 | Kelley | H01H 37/761 337/142 |
| 2016/0333243 | A1* | 11/2016 | Fukushima | C09K 5/044 |
| 2016/0369145 | A1* | 12/2016 | Fukushima | C09K 5/045 |
| 2016/0369146 | A1* | 12/2016 | Ueno | C09K 5/045 |
| 2017/0138642 | A1 | 5/2017 | Ueno et al. | |

FOREIGN PATENT DOCUMENTS

| | | |
|---|---|---|
| JP | 2015-12706 A | 1/2015 |
| JP | 2016-27296 A | 2/2016 |
| JP | 2016-77468 G | * 12/2016 |
| JP | 2016213956 | * 12/2016 |
| WO | WO 2012/157764 A1 | 11/2012 |
| WO | WO 2016/024576 A1 | 2/2016 |

OTHER PUBLICATIONS

Lisochkin, Y, et al. "Explosive-Hazard Estimates for Several Fluorine-Containing Monomers and Their Mixtures, Based on the Minimum Ignition Pressure with a Fixed Igniter Energy," Combustion, Explosion, and Shock Waves, vol. 42, No. 2, pp. 140-143, 2006.

* cited by examiner

HEAT CYCLE SYSTEM

TECHNICAL FIELD

The present invention relates to a heat cycle system employing a working fluid for heat cycle containing trifluoroethylene. Particularly, it relates to a heat cycle system in which self-decomposition reaction of trifluoroethylene is suppressed even if the interior of the system is at high temperature or under high pressure.

BACKGROUND ART

Heretofore, as a working fluid for heat cycle such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for heat cycle, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture refrigerant of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired.

Accordingly, in recent years, a hydrofluoroolefin (HFO) having a carbon-carbon double bond i.e. a HFC having a carbon-carbon double bond is expected. A HFO is a working fluid having less influence over the ozone layer and having less influence over global warming, since the carbon-carbon double bond is likely to be decomposed by OH radicals in the air.

As a working fluid for heat cycle employing a HFO, a working fluid using trifluoroethylene (HFO-1123) has been known, and for example, Patent Document 1 discloses a technique relating to a working fluid for heat cycle using HFO-1123 which has the above properties and with which excellent cycle performance will be obtained. Patent Document 1 also discloses an attempt to obtain a working fluid comprising HFO-1123 and various HFCs in combination for the purpose of increasing the flame retardancy, cycle performance, etc. of the working fluid.

Further, HFO-1123 is known to undergo self-decomposition with an ignition source at high temperature or under high pressure, when used alone. Therefore, Non-Patent Document 1 discloses an attempt to suppress self-decomposition reaction by mixing HFO-1123 with another component such as vinylidene fluoride to form a mixture having a lowered content of HFO-1123.

PRIOR ART DOCUMENTS

Patent Document

Patent Document 1: WO2012/157764

Non-Patent Document

Non-Patent Document 1: Combustion, Explosion, and Shock Waves, Vol. 42, No 2, pp. 140-143, 2006

DISCLOSURE OF INVENTION

Technical Problem

In a case where use of HFO-1123 as a working fluid for heat cycle is studied, as mentioned above, it should be noted that if HFO-1123 is exposed to high temperature or high pressure with an ignition source, HFO-1123 may undergo self-decomposition reaction.

Under these circumstances, it is an object of the present invention to provide a heat cycle system which employs as a working fluid for heat cycle trifluoroethylene (HFO-1123) having less influence over global warming and having favorable cycle performance (capacity), in which self-decomposition reaction of HFO-1123 is avoided even in a case where the working fluid for heat cycle is exposed to an ignition source at high temperature or under high pressure by any trouble such as abnormal operation.

Solution to Problem

The present inventors have conducted extensive studies to achieve the above object and as a result, found that self-decomposition reaction of HFO-1123 can be effectively avoided by a predetermined constitution of a heat cycle system even if the heat cycle system enters into an abnormal operation state, and accomplished the present invention.

That is, the present invention provides a heat cycle system having the following constitutions [1] to [11].

[1] A heat cycle system, comprising a circulation path in which a working fluid for heat cycle containing trifluoroethylene is circulated from a compressor via a condenser, an expansion valve and an evaporator to the compressor, wherein the compressor has in its electrical circuit a current-limiting apparatus capable of limiting the current within 6 milliseconds after the heat cycle system enters into an abnormal operation state.

[2] The heat cycle system according to [1], wherein the current-limiting apparatus is capable of limiting the current within 1 millisecond after the heat cycle system enters into an abnormal operation state.

[3] The heat cycle system according to [1] or [2], wherein the current limiting by the current-limiting apparatus is conducted by terminating a current.

[4] The heat cycle system according to any one of [1] to [3], wherein the current limiting is conducted by suppressing an energy which the working fluid for heat cycle receives from a spark energy generated in the heat cycle system to be 200 J or lower.

[5] The heat cycle system according to any one of [1] to [4], wherein the current-limiting apparatus is at least one member selected from a semiconductor protecting fuse, a fast-acting fuse, a fast-blow fuse and a current-limiting fuse.

[6] The heat cycle system according to any one of [1] to [5], wherein the working fluid for heat cycle contains trifluoroethylene in an amount of larger than 50 mass %.

[7] The heat cycle system according to [6], wherein the working fluid for heat cycle contains trifluoroethylene in an amount of larger than 60 mass %.

[8] The heat cycle system according to [6], wherein the working fluid for heat cycle contains from 60 to 80 mass % of trifluoroethylene and from 20 to 40 mass % of at least one of difluoromethane and 2,3,3,3-tetrafluoro-1-propene.

[9] The heat cycle system according to any one of [1] to [8], wherein the working fluid for heat cycle comprises trifluoroethylene and difluoromethane.

[10] The heat cycle system according to any one of [1] to [9], which is a refrigerating apparatus, an air-conditioning apparatus, a power generation system, a heat transport apparatus or a secondary cooling machine.

[11] The heat cycle system according to any one of [1] to [10], which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

Advantageous Effects of Invention

According to the heat cycle system of the present invention, it is possible to provide a heat cycle system which employs a working fluid containing HFO-1123 capable of suppressing influence over global warming and having practical heat cycle performance, and in which self-decomposition reaction of HFO-1123 can be avoided even in a case where the system enters into an abnormal operation state.

DESCRIPTION OF EMBODIMENTS

Now, embodiments of the present invention will be described with reference to drawings.

In this specification, a HFC means a saturated hydrofluorocarbon and is distinguished from a HFO, unless otherwise specified. Further, a HFC may be referred to as a saturated hydrofluorocarbon in some cases. Further, abbreviated names of halogenated hydrocarbon compounds such as HFCs and HFOs are described in brackets after the compound names, and in this specification, the abbreviated names are employed instead of the compound names as the case requires.

A HFC is a compound in which one or more of hydrogen atoms in a saturated hydrocarbon compound are substituted by a fluorine atom, and a HFO is a compound composed of hydrogen atoms, fluorine atoms and oxygen atoms and has a carbon-carbon double bond in its molecule.

First Embodiment

Now, a working fluid for heat cycle used for the heat cycle system according the present embodiment (hereinafter sometimes referred to simply as a working fluid) will be described. The working fluid used is a working fluid containing HFO-1123. Further, the working fluid used is preferably a working fluid for heat cycle having a content of HFO-1123 in the entire amount of the working fluid being higher than 50 mass % and at most 100 mass %.

The working fluid for heat cycle used in the present embodiment may consist solely of HFO-1123 or may contain HFO-1123 and other working fluid, as mentioned above. Here, the global warming potential (100 years) of HFO-1123 is 0.3 as a value measured in accordance with Intergovernmental Panel on Climate Change (IPCC), Fourth assessment report. In this specification, unless otherwise specified, GWP is a value (100 years) in IPCC, Fourth assessment report.

In such a manner, the working fluid used in the present embodiment, which contains HFO-1123 having a very low GWP in an amount of larger than 50 mass %, has a GWP suppressed low. In a case where GWP of other component is higher than that of HFO-1123, for example, as in the case of the after-described saturated HFC, the lower its content is, the lower GWP of the composition is.

HFO-1123 in the working fluid for heat cycle may undergo chain self-decomposition reaction with an ignition source at high temperature or under high pressure, when its content is high in the working fluid. Although the self-decomposition reaction can be suppressed by lowering the content of HFO-1123 in the working fluid, if the content is too low, GWP tends to increase, and the refrigerating capacity and the coefficient of performance tend to decrease in many cases, although it depends on other working fluid to be used in combination.

From the above viewpoint, the content of HFO-1123 in the working fluid for heat cycle is preferably higher than 50 mass %, more preferably higher than 60 mass %, further preferably higher than 70 mass %. By such a content, GWP will be sufficiently low, and a favorable refrigerating capacity can be secured.

[Optional Component]

The working fluid for heat cycle used in the present embodiment may optionally contain a compound commonly used for a working fluid in addition to HFO-1123 within a range not to impair effects of the present invention.

The optional component is preferably a HFC or a HFO other than HFO-1123.

(HFC)

As the HFC as an optional component, for example, a HFC having an effect to decrease the temperature glide, an effect to improve the capacity or an effect to further increase the efficiency, when used for heat cycle in combination with HFO-1123, is used. When the working fluid for heat cycle used in the present embodiment contains such a HFC, more favorable cycle performance will be obtained.

A HFC is known to have a high GWP as compared with HFO-1123. Accordingly, a HFC used as an optional component is selected with a view to adjusting the GWP within an acceptable range, in addition to improving cycle performance as the working fluid.

A HFC which has less influence over the ozone layer and which has less influence over global warming, is specifically preferably a $C_{1-5}$ HFC. The HFC may be linear, branched or cyclic.

The HFC may, for example, be difluoromethane (HFC-32), difluoroethane, trifluoroethane, tetrafluoroethane, pentafluoroethane (HFC-125), pentafluoropropane, hexafluoropropane, heptafluoropropane, pentafluorobutane or heptafluorocyclopentane.

Particularly, in view of less influence over the ozone layer and excellent refrigerating cycle performance, the HFC is preferably HFC-32, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, more preferably HFC-32, HFC-134a or HFC-125.

The HFC may be used alone or in combination of two or more.

Here, with respect to GWPs of the above preferred HFCs, GWP of HFC-32 is 675, GWP of HFC-134a is 1,430, and GWP of HFC-125 is 3,500. With a view to keeping GWP of the obtainable working fluid low, the HFC as an optional component is most preferably HFC-32.

(HFO Other than HFO-1123)

The HFO as an optional component may, for example, be 2,3,3,3-tetrafluoro-1-propene (HFO-1234yf), trans-1,2-difluoroethylene (HFO-1132(E)), cis-1,2-difluoroethylene (HFO-1132(Z)), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Particularly, in view of a high critical temperature, excellent safety and excellent coefficient of performance, the HFO as an optional component is preferably HFO-1234yf, HFO-1234ze(E) or HFO-1234ze(Z).

The HFO other than HFO-1123 may be used alone or in combination of two or more.

In a case where the working fluid for heat cycle used in the present embodiment contains the HFC and/or the HFO other than HFO-1123, as an optional component, the total content of the HFC and the HFO other than HFO-1123 in 100 mass % of the working fluid is preferably at most 50 mass %, more preferably at most 40 mass %, most preferably at most 30 mass %. The total content of the HFC and the HFO other than HFO-1123 in the working fluid is properly adjusted within the above range depending upon the type of the HFC and the HFO other than HFO-1123 used. On that occasion, the total content is adjusted with a view to decreasing the temperature glide, improving the capacity or further improving the efficiency, when used in combination with HFO-1123 for heat cycle, and further considering the global warming potential.

The working fluid for heat cycle used in the present embodiment, which particularly contains from 60 to 80 mass % of HFO-1123 and from 20 to 40 mass % of at least one of HFC-32 and HFO-1234yf, has less influence over global warming and is excellent in the refrigerating cycle performance. Further, even in a case where some trouble such as abnormal operation occurs in the heat cycle system, by combining a current-limiting apparatus, the self-decomposition reaction of HFO-1123 can be more likely to be avoided, whereby the heat cycle system has very high safety.

(Other Optional Component)

The working fluid for heat cycle used in the present embodiment may contain, other than the above optional components, carbon dioxide, a hydrocarbon, a chlorofluoroolefin (CFO), a hydrochlorofluoroolefin (HCFO) or the like, as other optional component. Such other optional component is preferably a component which has less influence over the ozone layer and which has less influence over global warming.

The hydrocarbon may, for example, be propane, propylene, cyclopropane, butane, isobutane, pentane or isopentane.

The hydrocarbon may be used alone or in combination of two or more.

In a case where the working fluid for heat cycle used in the present embodiment contains a hydrocarbon, its content is preferably at most 10 mass %, more preferably from 1 to 10 mass %, further preferably from 1 to 7 mass %, most preferably from 2 to 5 mass % per 100 mass % of the working fluid. When the content of the hydrocarbon is at most 10 mass %, the solubility of a mineral refrigerant oil in the working fluid will be more favorable.

The CFO may, for example, be chlorofluoropropene or chlorofluoroethylene. With a view to suppressing flammability of the working fluid without significantly decreasing the cycle performance of the working fluid for heat cycle of the present embodiment, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

In a case where the working fluid for heat cycle used in the present embodiment contains the CFO, its content is preferably 50 mass %, more preferably at most 40 mass %, most preferably at most 30 mass % per 100 mass % of the working fluid. When the content of the CFO is at most the upper limit, favorable cycle performance is likely to be obtained.

The HCFO may, for example, be hydrochlorofluoropropene or hydrochlorofluoroethylene. With a view to suppressing the flammability of the working fluid without significantly decreasing the cycle performance of the working fluid for heat cycle used in the present embodiment, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid for heat cycle used in the present embodiment contains the HCFO, the content of the HCFO per 100 mass % of the working fluid is preferably at most 50 mass %, more preferably at most 40 mass %, most preferably at most 30 mass %. When the content of the HCFO is at most the upper limit, favorable cycle performance is likely to be obtained.

In a case where the working fluid for heat cycle used in the present embodiment contains the above optional component and other optional component, their total content is preferably at most 50 mass %, more preferably less than 40 mass %, further preferably less than 30 mass % per 100 mass % of the working fluid.

The above-described working fluid for heat cycle used in the present embodiment contains HFO-1123 which is a HFO having less influence over global warming and which is excellent in the capacity as a working fluid, and has practical cycle performance while its influence over global warming is suppressed.

(Composition for Heat Cycle System)

The above working fluid for heat cycle is usually preferably mixed with a refrigerant oil to form a composition for a heat cycle system used in the heat cycle system of the present embodiment. Such a composition for a heat cycle system is used as enclosed in the circulation path of the heat cycle system. The composition for a heat cycle system may further contain a known additive such as a stabilizer or a leak detecting substance.

(Refrigerant Oil)

As a refrigerant oil, a known refrigerant oil which has been used for the composition for a heat cycle system together with a working fluid comprising a halogenated hydrocarbon may be used without any particular restrictions. The refrigerant oil may, for example, be specifically an oxygen-containing refrigerant oil (such as an ester refrigerant oil or an ether refrigerant oil), a fluorinated refrigerant oil, a mineral refrigerant oil or a hydrocarbon refrigerant oil.

The ester refrigerant oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). The dibasic acid ester oil may, for example, be specifically ditridecyl glutarate, di(2-ethylhexyl) adipate, diisodecyl adipate, ditridecyl adipate or di(3-ethylhexyl) sebacate.

The polyol ester oil is preferably an ester of a diol (such as ethylene glycol, 1,3-propanediol, propylene glycol, 1,4-butanediol, 1,2-butandiol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may be as defined above.

The polyol carbonate oil is an ester of carbonic acid with a polyol.

The polyol may be the above-described diol or the above-described polyol. Further, the polyol carbonate oil may be a ring-opening polymer of a cyclic alkylene carbonate.

The ether refrigerant oil may be a polyvinyl ether oil or a polyoxyalkylene oil.

The polyvinyl ether oil may be a polymer obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, butene, pentene, hexene, heptene, octene, diisobutylene, triisobutylene, styrene, α-methylstyrene or alkyl-substituted styrene.

The hydrocarbon monomer having an olefinic double bond may be used alone or in combination of two or more. In a case where the above compound has isomers, either isomer may be used.

The polyvinyl ether copolymer may be either of a block copolymer and a random copolymer. The polyvinyl ether oil may be used alone or in combination of two or more.

The polyoxyalkylene oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol.

The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator to be used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated refrigerant oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral refrigerant oil may, for example, be a naphthene mineral oil or a paraffin mineral oil obtained by purifying a refrigerant oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon refrigerant oil may, for example, be a poly-α-olefin, an alkylbenzene or an alkylnaphthalene.

The refrigerant oil may be used alone or in combination of two or more.

The refrigerant oil is preferably at least one member selected from a polyol ester oil, a polyvinyl ether oil and a polyglycol oil in view of compatibility with the working fluid.

The amount of the refrigerant oil is not limited within a range not to remarkably decrease the effects of the present invention, and is preferably from 10 to 100 parts by mass, more preferably from 20 to 50 parts by mass, per 100 parts by mass of the working fluid.

(Stabilizer)

The stabilizer is a component which improves the stability of the working fluid against heat and oxidation. As the stabilizer, a known stabilizer which has been used for a heat cycle system together with a working fluid comprising a halogenated hydrocarbon, for example, an oxidation resistance-improving agent, a heat resistance-improving agent or a metal deactivator, may be used without any particular restrictions.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthyamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). Each of the oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The amount of the stabilizer is not limited within a range not to remarkably decrease the effects of the present invention, and is preferably at most 5 parts by mass, more preferably at most 1 part by mass per 100 parts by mass of the working fluid.

(Leak Detecting Substance)

The leak detecting substance may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-H10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The amount of the leak detecting substance is not particularly limited within a range not to remarkably decrease the effects of the present invention, and is preferably at most 2 parts by mass, more preferably at most 0.5 part by mass per 100 parts by mass of the working fluid.

<Heat Cycle System>

Now, the heat cycle system of the present invention employing the above working fluid for heat cycle will be described. The heat cycle system is a system employing HFO-1123 as a working fluid for heat cycle. When the working fluid for heat cycle is applied to a heat cycle system, usually it is applied as a composition for a heat cycle system containing the working fluid.

Further, the heat cycle system of the present invention may be one of which the constitution of the basic heat cycle is the same as a conventionally known heat cycle system. The heat cycle system of the present invention may be any heat cycle system which has a circulation path in which a working fluid is circulated from a compressor via a condenser, an expansion valve and an evaporator to the compressor. The heat cycle system of the present invention may be a heat pump system utilizing heat obtained by a condenser or may be a refrigerating cycle system utilizing coldness obtained by an evaporator.

Such a heat cycle system may, for example, be specifically a refrigerating apparatus, an air-conditioning apparatus, a power generation system, a heat transfer apparatus or a secondary cooling machine. Among them, the heat cycle system of the present invention, which stably exhibits heat cycle performance in a working environment at higher temperature, is preferably employed as an air-conditioning apparatus to be disposed outdoors in many cases. Further, the heat cycle system of the present invention is preferably employed also for a refrigerating apparatus.

The air-conditioning apparatus may, for example, be specifically a room air-conditioner, a package air-conditioner (such as a store package air-conditioner, a building package air-conditioner or a plant package air-conditioner), a gas engine heat pump, a train air-conditioning system or an automobile air-conditioning system.

The refrigerating apparatus may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Now, as the heat cycle system according an embodiment of the present invention, a refrigerating cycle system 10 shown in FIG. 1 will be described. Here, a refrigerating cycle system is a system utilizing coldness obtained by an evaporator.

Figure 1:
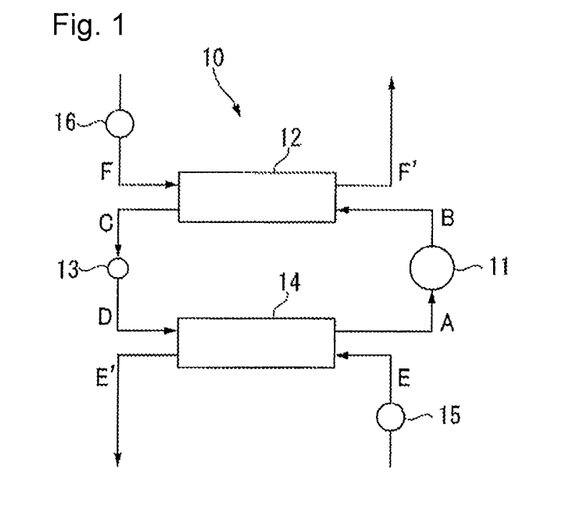
FIG. 1 is a schematic construction view illustrating a refrigerating cycle system as an example of a heat cycle system of the present invention.

A refrigerating cycle system 10 shown in FIG. 1 is a system comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12. That is, the refrigerating cycle system 10 is operated, in the same manner as a known heat cycle system, by circulating the working fluid for heat cycle from the compressor 11, via the condenser 12, the expansion valve 13 and the evaporator 14, to the compressor 11.

First, the flow of the refrigerating cycle will be described. In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure-enthalpy diagram (curve) as shown in FIG. 2, may be represented as a trapezoid having points A, B, C and D as vertexes.

Figure 2:
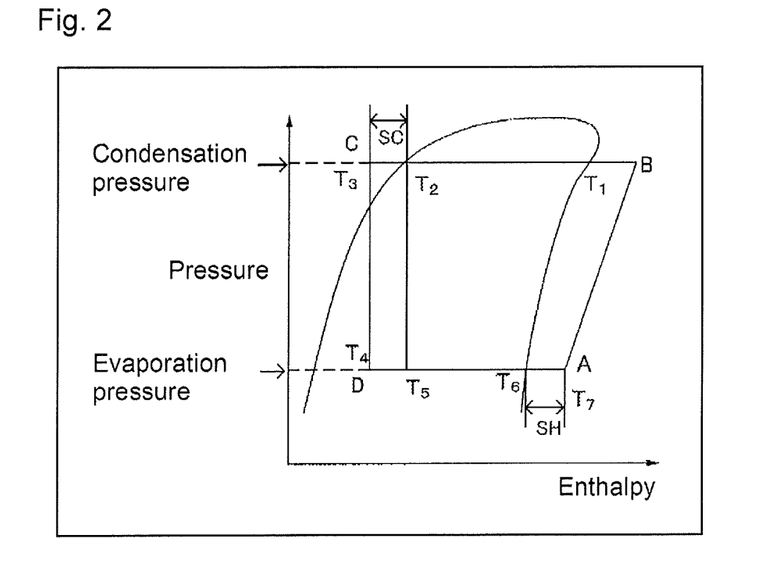
FIG. 2 is a cycle diagram illustrating the state change of a working fluid in the refrigerating cycle system in FIG. 1 on a pressure-enthalpy diagram.

The AB process is a process wherein adiabatic compression is carried out by the compressor 11 to change the high temperature/low pressure working fluid vapor A to a high temperature/high pressure working fluid vapor B, and is represented by the line AB in FIG. 2.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure-enthalpy diagram and the BC line, the intersection point $T_1$ on the high enthalpy side is the condensing temperature, and the intersection point $T_2$ on the low enthalpy side is the condensation boiling point temperature. Here, the temperature glide in the case of a non-azeotropic mixture fluid which is a mixed fluid of HFO-1123 with another working fluid, is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure-enthalpy diagram and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

And, in the heat cycle system according to the present embodiment, the compressor has in its electrical circuit a current-limiting apparatus capable of limiting the current within 6 milliseconds after detection of an abnormal operation state. By providing such a current-limiting apparatus, current limiting is carried out in the electrical circuit in a very short time, and the self-decomposition reaction of HFO-1123 can be avoided.

Here, the electrical circuit may be any electrical circuit capable of e.g. limiting and terminating operation of the compressor and may, for example, be a current supply path of a compressor circuit.

As mentioned above, HOF-1123 may undergo self-decomposition and explode with an ignition source at high temperature or under high pressure. However, the present inventors have found that even in a case where an ignition source is present, by suppressing an energy which the working fluid for heat cycle containing HFO-1123 receives from the ignition source to be a predetermined energy amount or smaller, occurrence of the self-decomposition reaction can be significantly suppressed. As the ignition source, for example, a spark energy generated in the heat cycle system in the electrical circuit may be mentioned as a typical ignition source, and the spark energy is generated usually e.g. by short circuiting of a conductor wire of the electrical circuit.

That is, it is estimated that when the working fluid consist solely of HFO-1123, if the energy which the working fluid receives exceeds 2.5 J, HFO-1123 will ignite and undergo self-decomposition reaction. And, in the case of a commonly assumed abnormal operation state, it is considered that HFO-1123 will ignite within about 100 milliseconds after the heat cycle system enters into an abnormal operation state.

Accordingly, in the present embodiment, by providing a current-limiting apparatus capable of limiting the current within 100 milliseconds after the heat cycle system enters into an abnormal operation state, the ignition is avoided, and the occurrence of the self-decomposition reaction is suppressed. By such a constitution, risks can be avoided even when the heat cycle system enters into an abnormal operation state.

Further, it is estimated that when the working fluid is composed of 60% of HFO-1123 and 40% of HFC-32, if the energy which the working fluid receives exceeds 200 J, HFO-1123 will undergo self-decomposition reaction and ignite. And, in the case of a commonly assumed abnormal operation state, it is considered that HFO-1123 will ignite within about 1 second after the heat cycle system enters into an abnormal operation state. In such a case, since the concentration of HFO-1123 in the working fluid is lower, the energy required for ignition is large as compared with a case where the working fluid consists solely of HFO-1123, and the time required until ignition tends to be longer.

From the above viewpoint, it is preferred to suppress the energy which the working fluid for heat cycle receives from the spark energy generated in the heat cycle system to be at most 200 J.

The energy which the working fluid for heat cycle receives from the spark energy generated in the heat cycle system is an energy having e.g. energy propagating to e.g. an apparatus main body present in the vicinity of the spark generation site removed from the spark energy generated in the system, and since the spark energy generated is the maximum value, by suppressing the spark energy generated in the heat cycle system to be at most 200 J, the energy which the working fluid for heat cycle receives from the spark energy can be suppressed to be at most 200 J.

In this specification, the abnormal operation state means a state out of the steady operation of the heat cycle system, in which the self-decomposition reaction of HFO-1123 may occur, and is properly set depending upon the apparatus constitution. Specifically, it is a state which satisfies any one of a state where the current of the electrical circuit of the compressor is at least the design upper limit current, a state where the voltage of the electrical circuit of the compressor is at least the design upper limit pressure, and a state where the temperature of the electrical circuit of the compressor is at least the design upper limit temperature.

Such an abnormal operation state can be detected in such a manner that the current, the voltage and the electric power in the electrical circuit of the compressor, the torque, the temperature and the pressure in the interior of the compressor, etc., are monitored, e.g. by a sensor and whether these values cross the respective thresholds set or not is always monitored. And, once the abnormal operation state is detected, the after-described current-limiting apparatus is activated to limit the current in the electrical circuit.

The mechanism of detection of the abnormal operation state and limitation of the current may be so constituted that a current-limiting apparatus capable of automatically limiting the current once the heat system enters into an abnormal operation state, for example, a fuse, is provided. In such a case, an apparatus or a sensor for detecting the abnormal operation state is not necessary, and the apparatus construction can be simplified.

Now, a compressor having a current-limiting apparatus in its power supply path will be described with reference to FIG. 3. Here, an example will be described in which a current-limiting apparatus is provided to a power supply path of a scroll compressor. A scroll compressor 110 shown in FIG. 3 comprises a closed container 111, and in the closed container 111, a driving means comprising a stator 112 and a rotor 113, a scroll compression mechanism 114 to compress the working fluid for heat cycle by revolutions of the driving means, a suction pipe 115 connected to the compressor, to introduce the working fluid for heat cycle into the scroll compression mechanism 114, a delivery pipe 116 connected to a condenser, to send the working fluid for heat cycle compressed in the closed container 111 to the condenser side, a power supply terminal 117 provided in the closed container 111, to supply electric power to the driving means as connected to an external power source, an external power source 118 connected to the power supply terminal 117, a power supply path 119 to supply electricity from the external power source 118 to a driving means, and a current-limiting apparatus 120 capable of limiting the current when an abnormal operation state is detected.

The scroll compressor 110 basically has the same constitution as a known compressor, and is characterized by the current-limiting apparatus 120. Accordingly, the current-limiting apparatus 120 will be described. Here, the compressor is described with reference to a scroll compressor as an example, however, a known compressor may be applied without any particular restrictions. For example, a piston crank compressor, a piston swash plate compressor, a rotary piston compressor, a rotary-vane compressor, a single rotor compressor, a twin rotor compressor or a centrifugal compressor may, for example, be mentioned.

Figure 3:
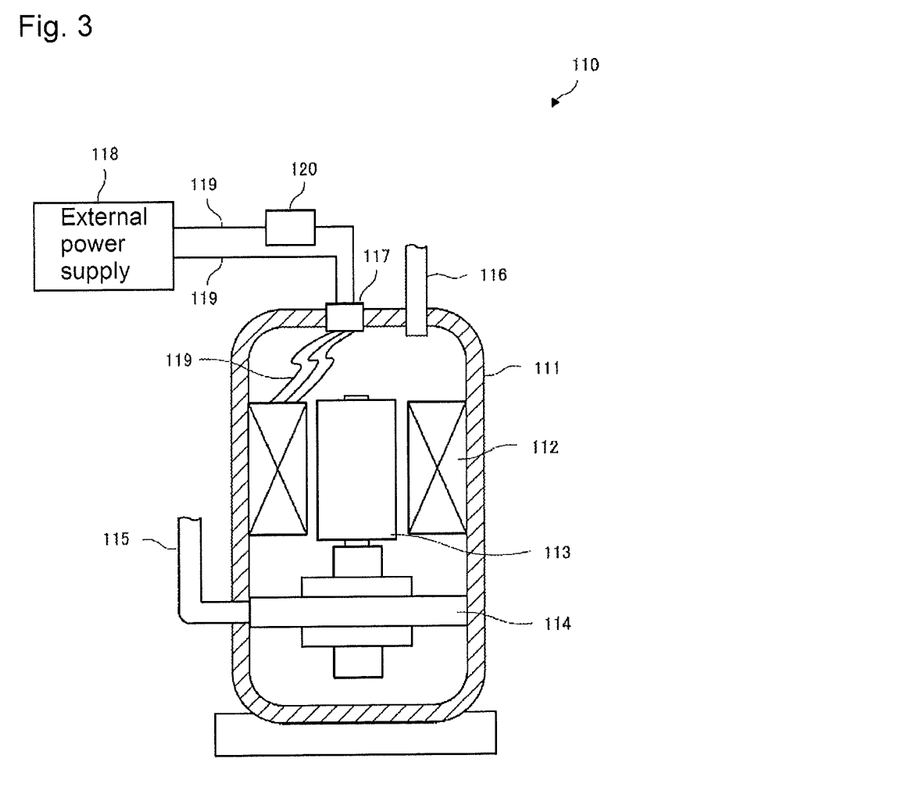
FIG. 3 is a view illustrating the schematic constitution of a compressor having a current-limiting apparatus.

The driving means of the compressor, for example, the stator 112 and the rotor 113 in FIG. 3, are usually connected to an external power source 118 via the power supply terminal 117, to get the drive energy by the power supply path 119. And, in the present embodiment, the current-limiting means 120 is provided to the power supply path 119.

As described above, by providing the current-limiting means 120 and limiting the current when the above-mentioned abnormal operation state is detected, it is possible to prevent self-decomposition reaction of HFO-1123 from occurring. That is, if the heat cycle system enters into an abnormal operation state, for example, the power supply path (conductor wire) connecting the power supply terminal 117 and the stator 122 becomes high temperature, the covering material of the conductor wire is deteriorated, and the conductor wire itself may be exposed. In such a case, the exposed conductor wire acts as an ignition source and the self-decomposition reaction of HFO-1123 may proceed. However, by providing the current-limiting means 120 as in the present embodiment, even if the conductor wire is exposed, the current can be limited in the power supply path in a very short time once any value exceeds the predetermined threshold. Thus, the energy which HFO-1123 receives can be effectively limited, and ignition by the self-decomposition reaction can be prevented.

The current-limiting apparatus 120 may be any apparatus so long as it is capable of limiting the current within 6 milliseconds from detection of an abnormal operation state in the power supply path 119. The current limiting may be any act which can reduce the current or the voltage (including termination of the current, that is, blocking of the current). The current-limiting apparatus may, for example, be a semiconductor protecting fuse, a fast-acting fuse, a fast-blow fuse or a current-limiting fuse. Further, the current-limiting apparatus 120 is preferably one capable of limiting the current within 1 millisecond from detection of the abnormal state.

The semiconductor protecting fuse has been used for protecting a semiconductor circuit and may be any semiconductor protecting fuse capable of limiting the current in the above-mentioned short time. Such a semiconductor protecting fuse may, for example, be specifically a semiconductor protecting fuse such as CR2L(S) type or CR6L type (each manufactured by Fuji Electric FA Components & Systems Co., Ltd., tradename: Super Rapid Fuse series).

The fast-acting fuse may, for example, be semiconductor protecting fast-acting fuse FRG type manufactured by Mitsubishi Electric Corporation.

The fast-blow fuse may, for example, be QAS type or QFS type, manufactured by Sensata Technologies, Inc.

Further, the abnormal operation state may be detected in such a manner that a sensor which detects the current, the voltage, the electric power, the torque, the temperature, the pressure or the like is separately provided, and if a value detected by the sensor exceeds the threshold value for the abnormal operation state, the current-limiting apparatus is activated.

The current limiting by the current-limiting apparatus 120 may be conducted by controlling the upper limit voltage to the maximum working voltage of the compressor or below, by controlling the upper limit current to the permissive current of the compressor or below, by terminating the current, or the like, in the power supply path 119.

(Moisture Concentration)

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigerant oil, deterioration of materials by an acid component formed in the cycle, formation of contaminants, etc. may arise. Particularly, if the refrigerant oil is a polyglycol oil or a polyol ester oil, it has extremely high moisture absorbing properties and is likely to undergo hydrolysis, and inclusion of moisture decreases properties of the refrigerant oil and may be a great cause to impair the long term reliability of a compressor. Accordingly, in order to suppress hydrolysis of the refrigerant oil, it is necessary to control the moisture concentration in the heat cycle system.

As a method of controlling the moisture concentration in the heat cycle system, a method of using a moisture-removing means such as a desiccating agent (such as silica gel, activated aluminum, zeolite or lithium chloride) may be mentioned.

The desiccating agent is preferably brought into contact with the working fluid in a liquid state, in view of the dehydration efficiency. For example, the desiccating agent is preferably located at the outlet of the condenser 12 or at the inlet of the evaporator 14 to be brought into contact with the working fluid.

The desiccating agent is preferably a zeolite desiccating agent in view of chemical reactivity of the desiccating agent and the working fluid, and the moisture absorption capacity of the desiccating agent.

The zeolite desiccating agent is, in a case where a refrigerant oil having a large moisture absorption as compared with a conventional mineral refrigerant oil is used, preferably a zeolite desiccating agent containing a compound represented by the following formula (3) as the main component in view of excellent moisture absorption capacity.

$$M_{2/n}O \cdot Al_2O_3 \cdot xSiO_2 \cdot yH_2O \quad (3)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid is used, the working fluid is adsorbed in the desiccating agent and as a result, chemical reaction between the working fluid and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid, it is possible to selectively adsorb and remove only moisture in the heat cycle system without adsorbing the working fluid. In other words, the working fluid is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the working fluid is not particularly limited.

The moisture concentration in the heat cycle system is preferably less than 10,000 ppm, more preferably less than 1,000 ppm, particularly preferably less than 100 ppm, by the mass ratio based on the working fluid for heat cycle.

(Non-Condensing Gas Concentration)

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the refrigerant oil and promotes their decomposition.

The non-condensing gas concentration is preferably less than 10,000 ppm, more preferably less than 1,000 ppm, particularly preferably less than 100 ppm by the mass ratio based on the working fluid for heat cycle.

(Chlorine Concentration)

If chlorine is present in the heat cycle system, it has adverse effects such as formation of a deposit by a reaction with a metal, friction of a bearing, and decomposition of the working fluid for heat cycle or the refrigerant oil.

The chlorine concentration in the heat cycle system is preferably at most 100 ppm, particularly preferably at most 50 ppm by the mass ratio based on the working fluid for heat cycle.

(Metal Concentration)

If a metal such as palladium, nickel or iron is present in the heat cycle system, it has adverse effects such as decomposition or oligomerization of HFO-1123.

The metal concentration in the heat cycle system is preferably at most 5 ppm, particularly preferably at most 1 ppm by the mass ratio based on the working fluid for heat cycle.

(Acid Concentration)

If an acid is present in the heat cycle system, it has adverse effects such as oxidative destruction or acceleration of self-decomposition reaction of HFO-1123.

The acid concentration in the heat cycle system is preferably at most 1 ppm, particularly preferably at most 0.2 ppm by the mass ratio based on the working fluid for heat cycle.

Further, it is preferred to provide a means to remove an acid content by a deoxidizing agent such as NaF in the heat cycle system, for the purpose of removing the acid content from the composition for heat cycle, thereby to remove the acid content from the heat cycle composition.

(Residue Concentration)

If a residue such as a metal powder, an oil other than the refrigerant oil or a high boiling component is present in the heat cycle system, it has adverse effects such as clogging of a vaporizer and an increase in the resistance of a rotating part.

The residue concentration in the heat cycle system is preferably at most 1,000 ppm, particularly preferably at most 100 ppm by the mass ratio based on the working fluid for heat cycle.

The residue may be removed by subjecting the working fluid for heat cycle to filtration through e.g. a filter. Further, the components (HFO-1123, HFO-1234yf and the like) of the working fluid for heat cycle may be separately subjected to filtration through a filter to remove the residue, before they are formed into a working fluid for heat cycle, and then the components are mixed to form a working fluid for heat cycle.

According to the above-mentioned heat cycle system, which employs a working fluid for heat cycle containing trifluoroethylene, practical cycle performance will be obtained while the influence over global warming is suppressed, and the self-decomposition reaction of HFO-1123 at the time of abnormal operation can be suppressed.

EXAMPLES

Now, the present invention will be described in further detail with reference to Reference Examples and Reference Comparative Examples in which a test was conducted in a pressure resistant container (autoclave) assuming the interior of the heat cycle system. However, it should be understood that the present invention is by no means restricted to such Reference Examples and Reference Comparative Examples.

Reference Example 1

Into a pressure resistant container (autoclave) having an internal capacity of 650 cm$^3$, evacuated of air by a vacuum pump, and provided with electrodes in the interior, HFO-1123 was charged, and the temperature was increased to 100° C. by an external heater. After the temperature in the reactor reached 100° C., excess HFO-1123 was purged to adjust the internal pressure in the autoclave to be 2 MPaG. The electrodes used were connected to an external alternating current power supply, and Super Rapid Fuse CR2LS-10 (tradename) manufactured by Fuji Electric FA Components & Systems Co., Ltd. was provided between the electrode and the alternating current power supply and disposed in the autoclave.

Then, to the electrodes disposed in the autoclave, an alternating current of 150 V was applied to generate an electric spark in the autoclave. The current and the voltage were measured by oscilloscope TDS5054B manufactured by TEKTRONIX, INC. Whether the self-decomposition reaction occurred or not was confirmed by measuring temperature and pressure changes in the autoclave which occurred after the application. The temperature and the pressure were measured by MX-100 manufactured by Yokogawa Test & Measurement Corporation. Further, the current was simply recorded by connecting an electric shunt 221603 manufactured by Yokogawa Test & Measurement Corporation to MX-100.

It is judged that the self-decomposition reaction proceeded under the temperature and pressure conditions when the pressure increased by more than 1% of the initial pressure.

Figure 4:
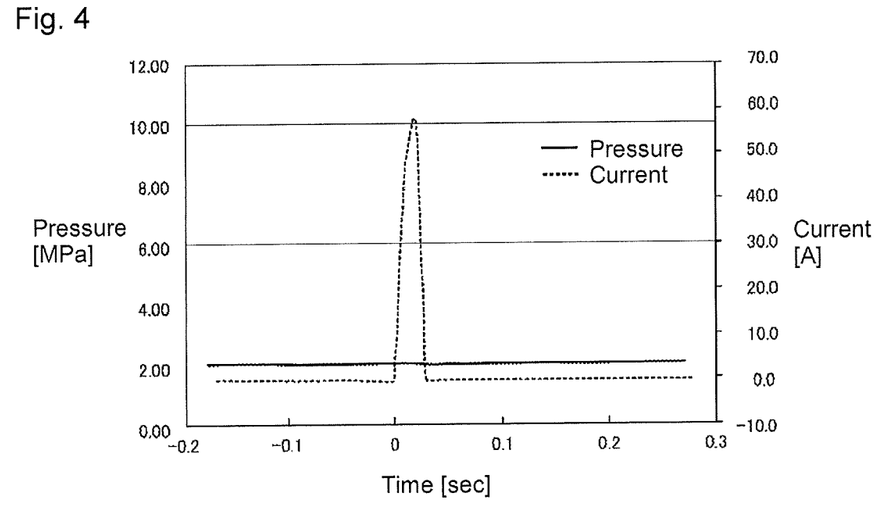
FIG. 4 is a view illustrating changes with time of the current and the pressure in Reference Example 1.
Figure 5:
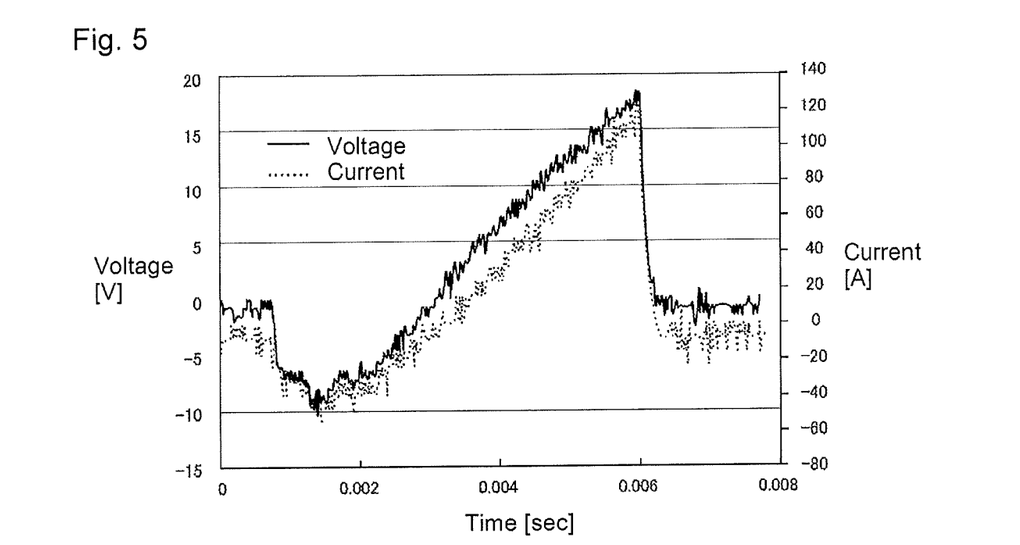
FIG. 5 is a view illustrating changes with time of the current and the voltage in Reference Example 1.

As shown in FIG. 4, no change in the internal pressure was observed even when an alternating current voltage of 150 V was applied to the electrodes to generate a spark. The voltage and the current applied to the electrodes were observed only in 6 milliseconds (0.0053 second) after the generation of the spark, as shown in FIG. 5. This is because the above Super Rapid Fuse operated and blew out, whereby the voltage and current changes occurred only in a very short time, and progress of the self-decomposition reaction of HFO-1123 could be suppressed.

The results were analyzed, whereupon the energy applied by the electric spark in the autoclave was 0.33 J, which proved that even when an overvoltage was applied, by providing Rapid Fuse which can block the current instantaneously, the current flowing in the system was suppressed, and even a spark was generated, its energy could be made extremely small.

As compared with the energy in the after-described Reference Comparative Example 1, the energy generated was suppressed to about one fifteenth of 4.7 J in a case where Rapid Fuse was not provided.

The electrodes disposed in the autoclave had such a shape that edges of two copper plates facing each other were brought into contact with each other and the two copper plates had a coil-shaped contact point. A principle is applied such that when a voltage is applied to one of the copper plates, a current flows in the two copper plates through the contact point, a magnetic field is generated in accordance with Ampere's law in their interior, and by the generated magnetic field, the current is affected by an outward force in accordance with Fleming's law, the copper plates are separated and in that moment, a spark is generated.

Reference Comparative Example 1

The same operation as in Reference Example 1 was carried out using a pressure resistant container (autoclave) having the same apparatus structure except that Super Raid Fuse was not provided between the electrode and the alternating current power supply.

Figure 6:
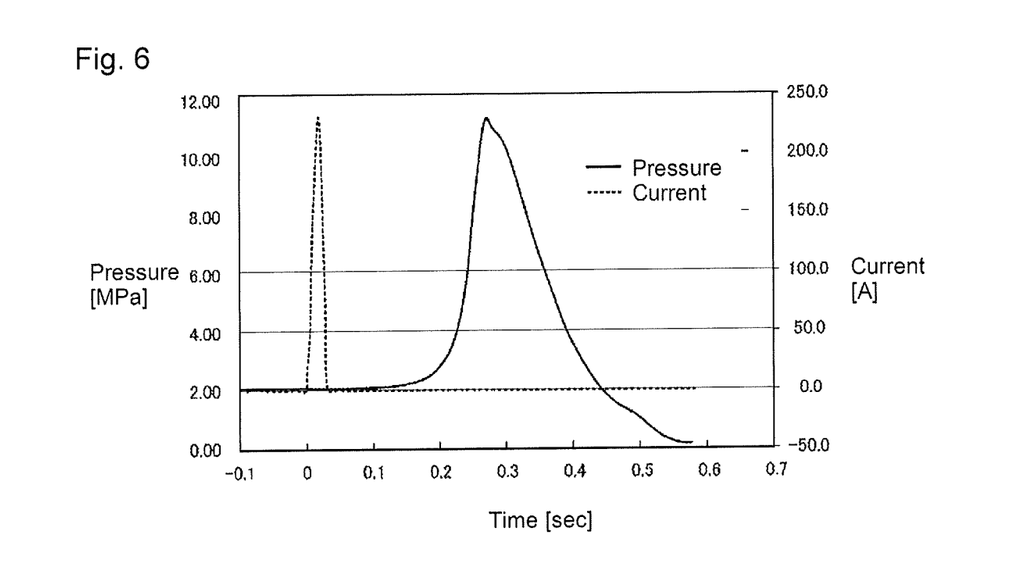
FIG. 6 is a view illustrating changes with time of the current and the pressure in Reference Comparative Example 1.

As shown in FIG. 6, an alternating current voltage of 150 V was applied to the electrodes to generate a spark, whereupon the pressure suddenly increased about 0.2 second after the generation of the spark, and the self-decomposition reaction (disproportionation) of HFO-1123 was observed.

Figure 7:
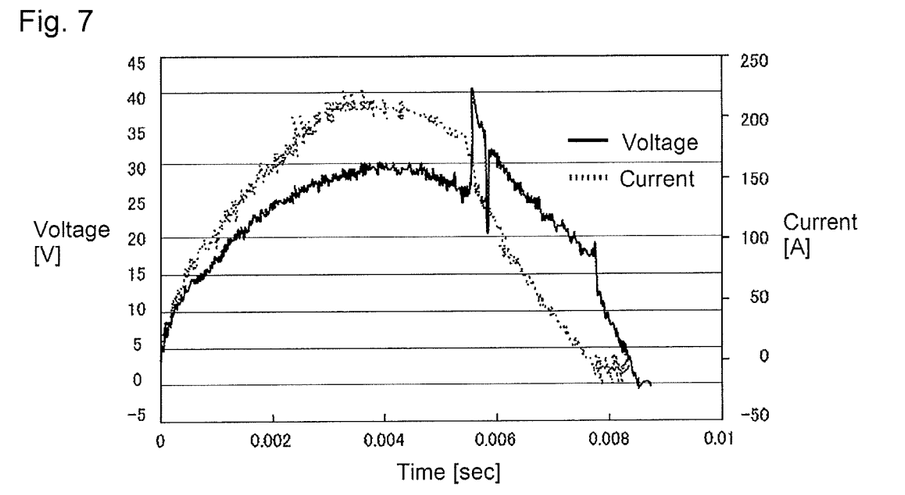
FIG. 7 is a view illustrating changes with time of the current and the voltage in Reference Comparative Example 1.

Further, the voltage and the current applied to the electrodes were observed only in 0.01 second as shown in FIG. 7. The results were analyzed, whereupon it was found that the energy applied by the electric spark in the rector was 4.7 J.

Reference Example 2

The same pressure resistant reactor (autoclave) used in Reference Example 1 was evacuated of air by a vacuum pump, and HFO-1123 and HFC-32 were charged in amounts of HFO-1123/HFC-32=80%/20% by mass percent. Then, the temperature was increased to 100° C. by an external heater. After the temperature in the reactor reached 100° C., excess gas in the interior of the reactor was purged to adjust the internal pressure in the autoclave would be 4 MPaG. The electrodes used were, in the same manner as in Reference Example 1, connected to an external alternating-current power supply, and Super Rapid Fuse CR2LS-10 (tradename) manufactured by Fuji Electric FA Components & Systems Co., Ltd. was provided between the electrode and the alternating current power supply and disposed in the autoclave.

Then, to the electrodes disposed in the autoclave, an alternating current of 120 V was applied to generate an electric spark in the autoclave. In the same manner as in Reference Example 1, it was judged that the self-decomposition reaction proceeded under the temperature and pressure conditions when the pressure increased by more than 1% of the initial pressure.

Figure 8:
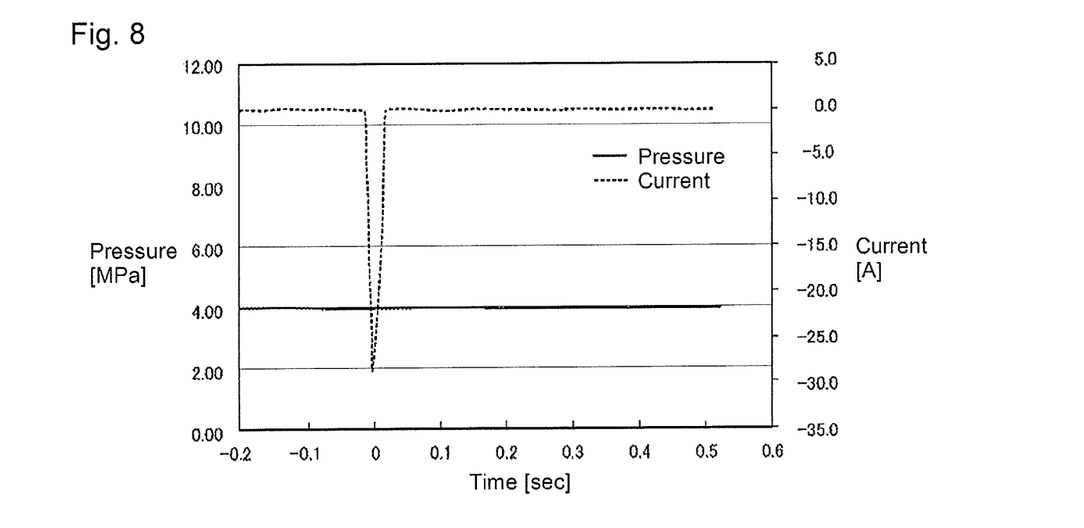
FIG. 8 is a view illustrating changes with time of the current and the pressure in Reference Example 2.
Figure 9:
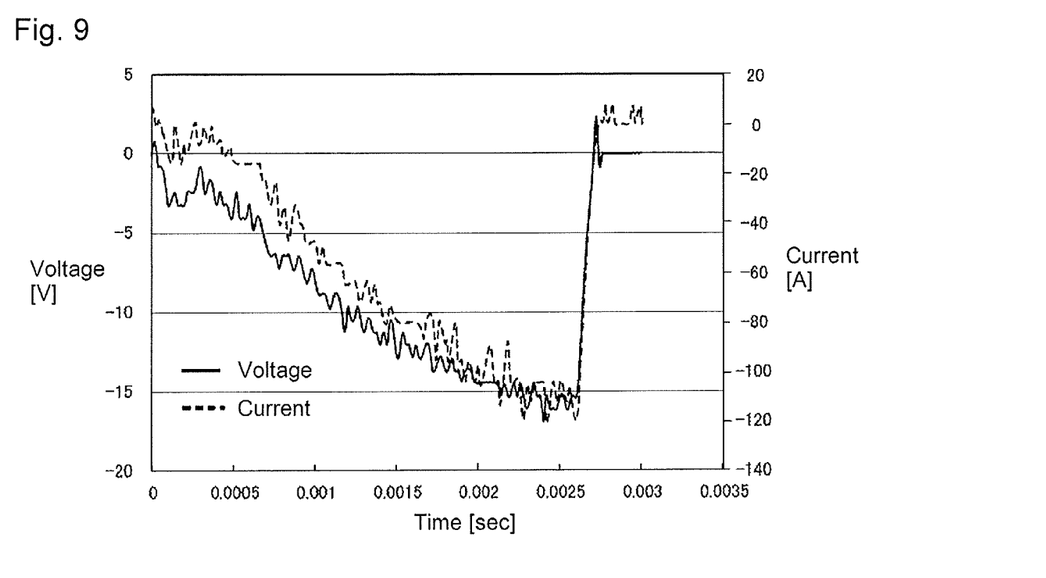
FIG. 9 is a view illustrating changes with time of the current and the voltage in Reference Example 2.

As shown in FIG. 8, no change in the internal pressure was observed even when an alternating current voltage of 120 V was applied to the electrodes to generate a spark. The voltage and the current applied to the electrodes were observed only in 3 milliseconds (0.0027 second) after the generation of the spark, as shown in FIG. 9. This is because the above Super Rapid Fuse operated and blew out, whereby the voltage and current changes occurred only in a very short time, and progress of the self-decomposition reaction of HFO-1123 could be suppressed.

The results were analyzed, whereupon the energy applied by the electric spark in the autoclave was 0.025 J, which proved that even when an overvoltage was applied, by providing Rapid Fuse which can block the current instantaneously, the current flowing in the system was suppressed, and even a spark was generated, its energy could be made extremely small.

As compared with the energy in the after-described Reference Comparative Example 2, the energy generated is suppressed to about one three-hundredth of 7.9 J in a case where Rapid Fuse was not provided.

Reference Comparative Example 2

The same operation as in Reference Example 2 was carried out using a pressure resistant container (autoclave) having the same apparatus structure except that Super Raid Fuse was not provided between the electrode and the alternating current power supply.

Figure 10:
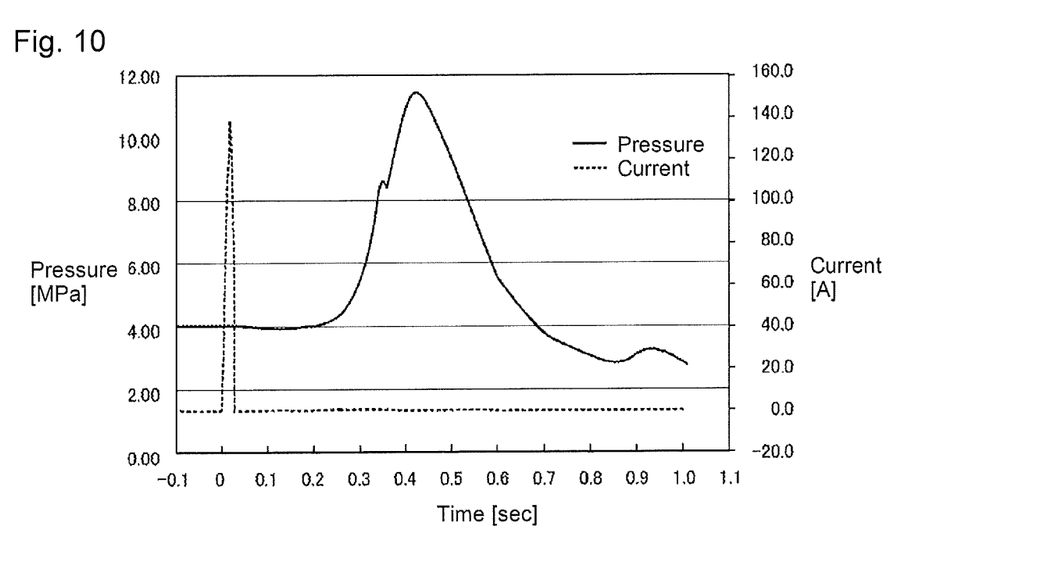
FIG. 10 is a view illustrating changes with time of the current and the pressure in Reference Comparative Example 2.

As shown in FIG. 10, an alternating current voltage of 120 V was applied to the electrodes to generate a spark, whereupon the pressure suddenly increased about 0.2 second after the generation of the spark, and the self-decomposition reaction (disproportionation) of HFO-1123 was observed.

Figure 11:
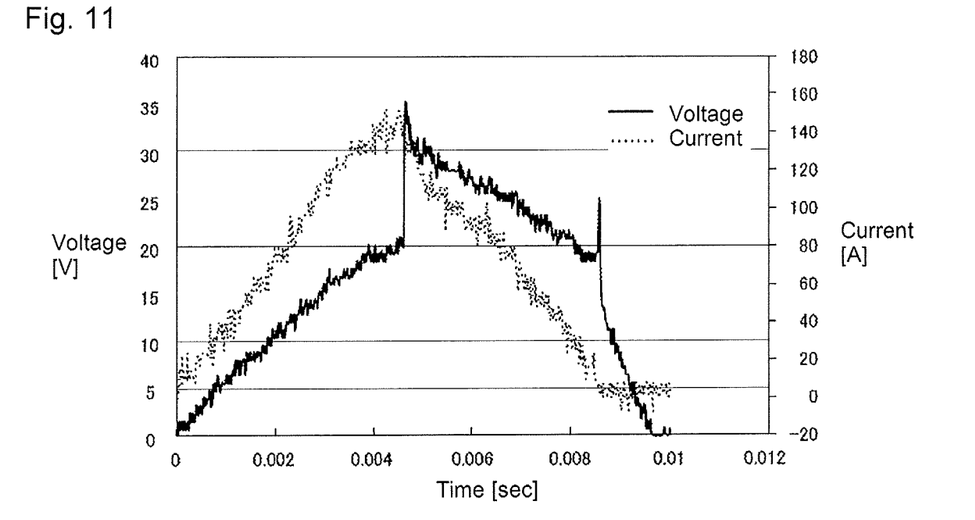
FIG. 11 is a view illustrating changes with time of the current and the voltage in Reference Comparative Example 2.

Further, the voltage and the current applied to the electrodes were observed only in 0.097 second after the generation of the spark as shown in FIG. 11. The results were analyzed, whereupon it was found that the energy applied by the electric spark in the rector was 7.9 J.

Reference Example 3

The same pressure resistant reactor (autoclave) used in Reference Example 1 was evacuated of air by a vacuum pump, and HFO-1123 and HFC-32 were charged in amounts of HFO-1123/HFC-32=60%/40% by mass percent. Then, the temperature was increased to 100° C. by an external heater. After the temperature in the reactor reached 100° C., excess gas in the interior of the reactor was purged to adjust the internal pressure in the autoclave to be 4 MPaG. The electrodes used were, in the same manner as in Reference Example 1, connected to an external alternating current power supply, and Super Rapid Fuse CR2LS-10 (tradename) manufactured by Fuji Electric FA Components & Systems Co., Ltd. was provided between the electrode and the alternating current power supply and disposed in the autoclave.

Then, to the electrodes disposed in the autoclave, an alternating current of 180 V was applied to generate an electric spark in the autoclave. In the same manner as in Reference Example 1, it was judged that the self-decomposition reaction proceeded under the temperature and pressure conditions when the pressure increased by more than 1% of the initial pressure.

No change in the internal pressure was observed even when an alternating current voltage of 180 V was applied to the electrodes to generate a spark, and it was confirmed that disproportionation was suppressed. The voltage and the current were observed only in 6 milliseconds (0.0055 second) after the generation of the electric spark, and the spark energy applied was analyzed to be 0.85 J.

As compared with the energy in the after-described Reference Comparative Example 3, the energy generated is suppressed to be about one three-hundredth of 260 J in a case where Rapid Fuse was not provided.

Reference Comparative Example 3

The same operation as in Reference Example 3 was carried out using a pressure resistant container (autoclave) having the same apparatus structure except that Super Raid Fuse was not provided between the electrode and the alternating current power supply.

An alternating current voltage of 180 V was applied to the electrodes to generate a spark, whereupon the pressure suddenly increased about 0.2 second after the generation of the spark, and the self-decomposition reaction (disproportionation) of HFO-1123 was observed.

Further, the voltage and the current applied to the electrodes were observed only in 0.2 second. By analysis, the energy applied by the electric spark was found to be 260 J.

[Method for Calculating Applied Energy]

The above applied energy was calculated as follows.

Figure 12:
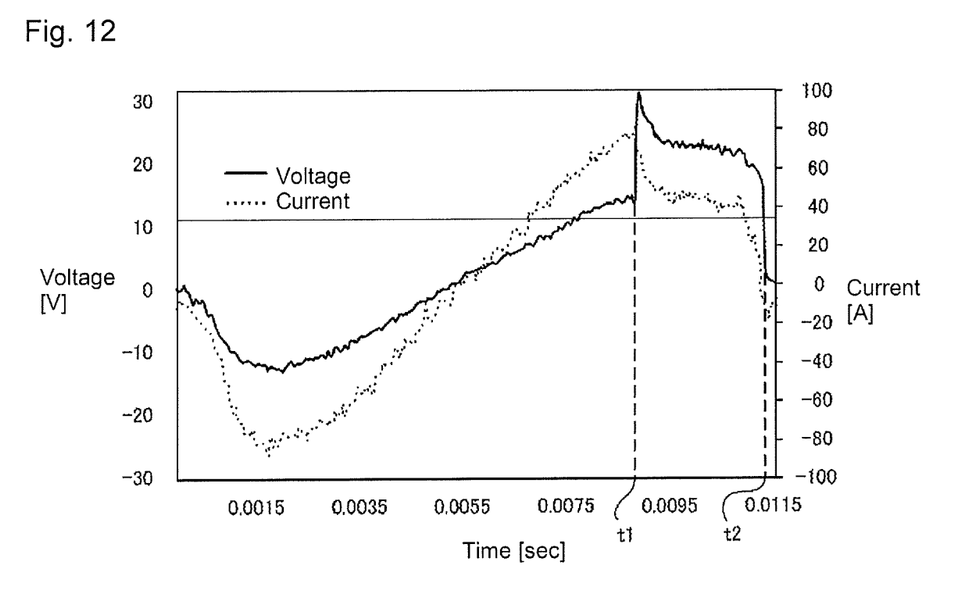
FIG. 12 is a view illustrating changes with time of the current and the voltage to describe a method for calculating an applied energy.

Typical current and voltage curves in a case where an alternating current voltage was applied are shown in FIG. 12. In the graph, there is a point where the voltage suddenly changes is present. When an electric spark is generated, the resistance of the entire circuit suddenly increases in a step, by the influence of which the voltage curve changes. That point is taken as the electric spark generation time, and a point where the resistance returns to the original resistance of the entire circuit is taken as the spark generation termination time. Taking the current and voltage values during these points as I(t) and V(t), the energy applied to the system was calculated in accordance with the formula (1).

$$E=\int_{t_1}^{t_2} I(t) \cdot V(t) dt$$

As described above, according to the heat cycle system according to the present embodiment, even when a heat cycle system which employs a working fluid containing HFO-1123 enters into an abnormal operation state, the self-decomposition reaction can be avoided, and damages of the apparatus, etc., can be suppressed.

INDUSTRIAL APPLICABILITY

The heat cycle system of the present invention is useful as a refrigerating apparatus (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), a power generation system (such as exhaust heat recovery power generation), a heat transport apparatus (such as a heat pipe) or a secondary cooling machine.

REFERENCE SYMBOLS

10: refrigerating cycle system, 11: compressor, 12: condenser, 13: expansion valve, 14: evaporator, 15, 16: pump, 110: scroll compressor, 111: closed container, 112: stator, 113: rotor, 114: scroll compression mechanism, 115: suction pipe, 116: delivery pipe, 117: power supply terminal, 118: external power supply, 119: power supply path, 120: current-limiting apparatus This application is a continuation of PCT Application No. PCT/JP2018/009522, filed on Mar. 12, 2018, which is based upon and claims the benefit of priority from Japanese Patent Application No. 2017-049165 filed on Mar. 14, 2017. The contents of those applications are incorporated herein by reference in their entireties.

What is claimed is:

1. A heat cycle system, comprising a circulation path in which a working fluid for heat cycle containing trifluoroethylene is circulated from a compressor via a condenser, an expansion valve and an evaporator to the compressor, wherein the compressor has in its electrical circuit a current-limiting apparatus capable of limiting the current within 6 milliseconds after the heat cycle system enters into an abnormal operation state.

2. The heat cycle system according to claim 1, wherein the current-limiting apparatus is capable of limiting the current within 1 millisecond after the heat cycle system enters into an abnormal operation state.

3. The heat cycle system according to claim 1, wherein the current limiting by the current-limiting apparatus is conducted by terminating a current.

4. The heat cycle system according to claim 1, wherein the current limiting is conducted by suppressing an energy which the working fluid for heat cycle receives from a spark energy generated in the heat cycle system to be 200 J or lower.

5. The heat cycle system according to claim 1, wherein the current-limiting apparatus is at least one member selected from a semiconductor protecting fuse, a fast-acting fuse, a fast-blow fuse and a current-limiting fuse.

6. The heat cycle system according to claim 1, wherein the working fluid for heat cycle contains trifluoroethylene in an amount of larger than 50 mass %.

7. The heat cycle system according to claim 6, wherein the working fluid for heat cycle contains trifluoroethylene in an amount of larger than 60 mass %.

8. The heat cycle system according to claim 6, wherein the working fluid for heat cycle contains from 60 to 80 mass % of trifluoroethylene and from 20 to 40 mass % of at least one of difluoromethane and 2,3,3,3-tetrafluoro-1-propene.

9. The heat cycle system according to claim 1, wherein the working fluid for heat cycle comprises trifluoroethylene and difluoromethane.

10. The heat cycle system according to claim 1, which is a refrigerating apparatus, an air-conditioning apparatus, a power generation system, a heat transport apparatus or a secondary cooling machine.

11. The heat cycle system according to claim 1, which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

* * * * *